United States Patent
Oehme

(10) Patent No.: US 8,061,459 B2
(45) Date of Patent: Nov. 22, 2011

(54) TRACTION CONTROL METHOD FOR A TRACKED VEHICLE

(75) Inventor: Clifford H. Oehme, Avon, IN (US)

(73) Assignee: GM Global Technology Operations LLC, Detroit, MI (US)

(*) Notice: Subject to any disclaimer, the term of this patent is extended or adjusted under 35 U.S.C. 154(b) by 1301 days.

(21) Appl. No.: 11/333,653

(22) Filed: Jan. 17, 2006

(65) Prior Publication Data
US 2007/0179698 A1 Aug. 2, 2007

(51) Int. Cl.
*B62D 11/02* (2006.01)
(52) U.S. Cl. .................. 180/6.7; 180/6.48; 701/82
(58) Field of Classification Search ............ 701/82; 180/6.7, 6.48, 6.5
See application file for complete search history.

(56) References Cited

U.S. PATENT DOCUMENTS

| | | | | |
|---|---|---|---|---|
| 3,194,017 A * | 7/1965 | Weisenbach | ............. | 60/487 |
| 3,199,376 A * | 8/1965 | De Lalio | ............. | 475/24 |
| 3,373,636 A * | 3/1968 | Livezey et al. | ............. | 475/23 |
| 3,583,508 A * | 6/1971 | Waddington et al. | ......... | 180/6.44 |
| 4,087,135 A * | 5/1978 | Unruh | ............. | 305/125 |
| 5,101,919 A * | 4/1992 | Ossi | ............. | 180/6.2 |
| 5,307,888 A * | 5/1994 | Urvoy | ............. | 180/6.2 |
| 5,388,045 A | 2/1995 | Kamiya | | |
| 5,517,416 A * | 5/1996 | Torii et al. | ............. | 701/50 |
| 5,948,029 A * | 9/1999 | Straetker | ............. | 701/41 |
| 6,276,188 B1 * | 8/2001 | Horiuchi | ............. | 73/1.37 |
| 6,434,457 B2 * | 8/2002 | Okita et al. | ............. | 701/34 |
| 6,456,924 B1 * | 9/2002 | Schmitt et al. | ............. | 701/82 |
| 6,466,857 B1 * | 10/2002 | Belvo | ............. | 701/82 |
| 6,474,426 B2 * | 11/2002 | Yamamoto et al. | ......... | 180/9.44 |
| RE38,632 E * | 10/2004 | Schmidt et al. | ............. | 701/41 |
| 7,337,054 B2 * | 2/2008 | Pandey et al. | ............. | 701/82 |
| 2002/0020579 A1 * | 2/2002 | Yamamoto et al. | ......... | 180/446 |
| 2003/0030323 A1 | 2/2003 | Ford | | |
| 2004/0121871 A1 * | 6/2004 | Thompson | ............. | 475/83 |
| 2004/0193349 A1 * | 9/2004 | Flann et al. | ............. | 701/50 |
| 2005/0027427 A1 * | 2/2005 | Nagaya et al. | ............. | 701/84 |
| 2005/0075784 A1 * | 4/2005 | Gray et al. | ............. | 701/201 |
| 2005/0187067 A1 * | 8/2005 | Dobereiner | ............. | 477/5 |
| 2005/0236896 A1 * | 10/2005 | Offerle et al. | ............. | 303/146 |
| 2005/0284672 A1 * | 12/2005 | Egen et al. | ............. | 180/65.1 |
| 2006/0195247 A1 * | 8/2006 | Urvoy et al. | ............. | 701/93 |

* cited by examiner

*Primary Examiner* — Joanne Silbermann
*Assistant Examiner* — Maurice Williams
(74) *Attorney, Agent, or Firm* — Quinn Law Group, PLLC

(57) ABSTRACT

The present invention provides a traction control method for a tracked vehicle such as a military tank. The method includes calculating a track proportionality factor and a vehicle proportionality factor based on predefined attributes of the tracked vehicle. A minimum turn radius of the tracked vehicle is calculated based on the velocity of the tracked vehicle, the maximum coefficient of friction between the tracks of the tracked vehicle and the ground (0.7), and gravitational acceleration (9.80665 m/s2). A sprocket rotational speed is calculated based on the pitch diameter of the tracked vehicle sprockets and the velocity of the tracked vehicle. Based on the preceding calculations, the method of the present invention calculates a required track speed differential configured to turn the tracked vehicle at the minimum turn radius. If a commanded turn radius is less than the minimum turn radius, the track speed differential of the tracked vehicle is limited to the required track speed differential to prevent the tracked vehicle from slipping.

15 Claims, 2 Drawing Sheets

TRACTION CONTROL METHOD FOR A TRACKED VEHICLE

TECHNICAL FIELD

The present invention is drawn to a traction control method for a tracked vehicle.

BACKGROUND OF THE INVENTION

For purposes of the present invention, tracked vehicles are defined as vehicles that ride on tracks instead of or in addition to wheels, such as, for example, military tanks. A tracked vehicle steers by way of differential track speed which is generally imparted by the transmission. It has been observed that the maximum coefficient of friction (COF or μ) that can be achieved between the tracks and the ground is generally approximately 0.7. If the driver intentionally or accidentally turns too sharply for the current vehicle speed such that the 0.7 coefficient of friction is exceeded, the vehicle will slide and may loose control. The coefficient of friction will hereinafter be defined as a value indicating the amount of friction between two surfaces, wherein a 0.0 COF represents no friction and a 1.0 COF represents the maximum friction.

SUMMARY OF THE INVENTION

The present invention provides a traction control method for a tracked vehicle. More precisely, the present invention provides a method for establishing a minimum allowable turn radius calculated to prevent the vehicle from exceeding the 0.7 coefficient of friction. In other words, if the operator commands a turn radius less than the calculated minimum allowable turn radius, the method of the present invention would supersede the operator command and turn the vehicle at the calculated minimum allowable turn radius such that the vehicle does not slip.

The method of the present invention preferably includes calculating a track proportionality factor and a vehicle proportionality factor based on predefined attributes of the tracked vehicle. A minimum turn radius of the tracked vehicle is calculated based on the velocity of the tracked vehicle, the maximum coefficient of friction between the tracks of the tracked vehicle and the ground (0.7), and gravitational acceleration (9.80665 m/s$^2$). A sprocket rotational speed is calculated based on the pitch diameter of the tracked vehicle sprockets and the velocity of the tracked vehicle. Based on the preceding calculations, the method of the present invention calculates a required track speed differential configured to turn the tracked vehicle at the minimum turn radius.

After calculating the required track speed differential configured to turn the tracked vehicle at the minimum turn radius, the method of the present invention determines if a commanded turn radius is less than the minimum turn radius. If the commanded turn radius is greater than or equal to the minimum turn radius, the method of the present invention executes the turn command. If the commanded turn radius is less than the minimum turn radius, the method of the present invention limits the track speed differential of the tracked vehicle to the required track speed differential such that the tracked vehicle does not slip.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
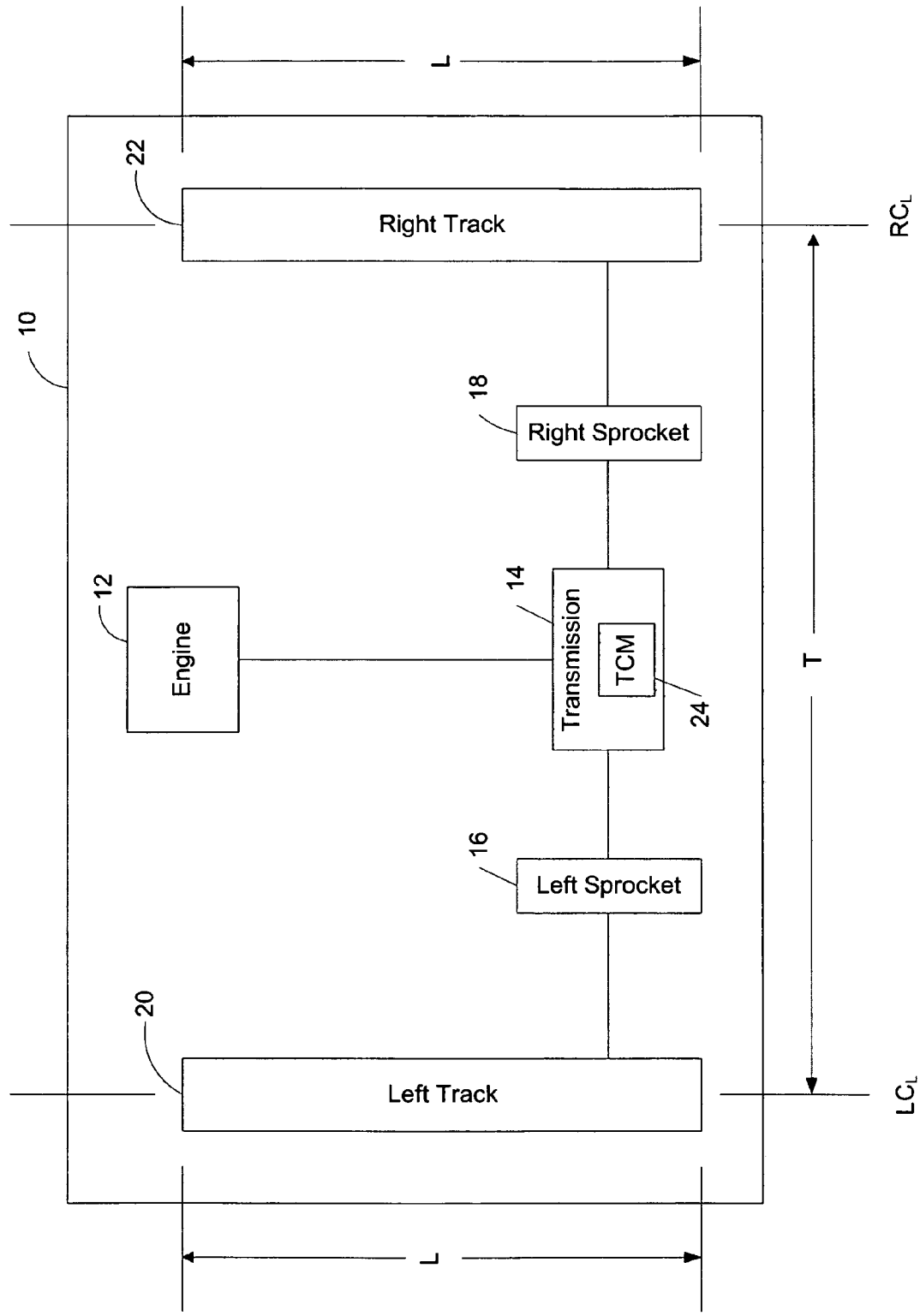
FIG. 1 is a schematic diagram of a tracked vehicle according to the present invention.

Referring to the drawings, wherein like reference numbers refer to like components, FIG. 1 shows a schematic depiction of a tracked vehicle 10 having an engine 12, a transmission 14, left sprocket 16, a right sprocket 18, a left track 20, and a right track 22. For purposes of the present invention, tracked vehicles are defined as vehicles that ride on tracks instead of or in addition to wheels, such as, for example, military tanks. The left and right tracks 20, 22 each define a vehicle track length L representing the length of the tracks 20, 22 that is in contact with the ground. The left and right tracks 20, 22 each define a centerline $LC_L$ and $RC_L$, respectively. The distance between the left and right track centerlines $LC_L$ and $RC_L$ is hereinafter referred to as the vehicle track center distance T.

The tracked vehicle 10 steers by way of a track speed differential ΔV. The track speed differential ΔV is defined for purposes of the present invention as difference between the left track speed $V_L$ and the right track speed $V_R$ such that $\Delta V=(V_L-V_R)$. The track speed differential ΔV is preferably imparted by the transmission 14. More precisely, the transmission 14 transfers power from the engine 12 to the left and right sprockets 16, 18 independently. As an example, if the transmission 14 transfers more power to the left sprocket 16 than the right sprocket 18, the tracked vehicle 10 turns right. Similarly, if the transmission 14 transfers more power to the right sprocket 18 than the left sprocket 16, the tracked vehicle 10 turns left.

Figure 2:
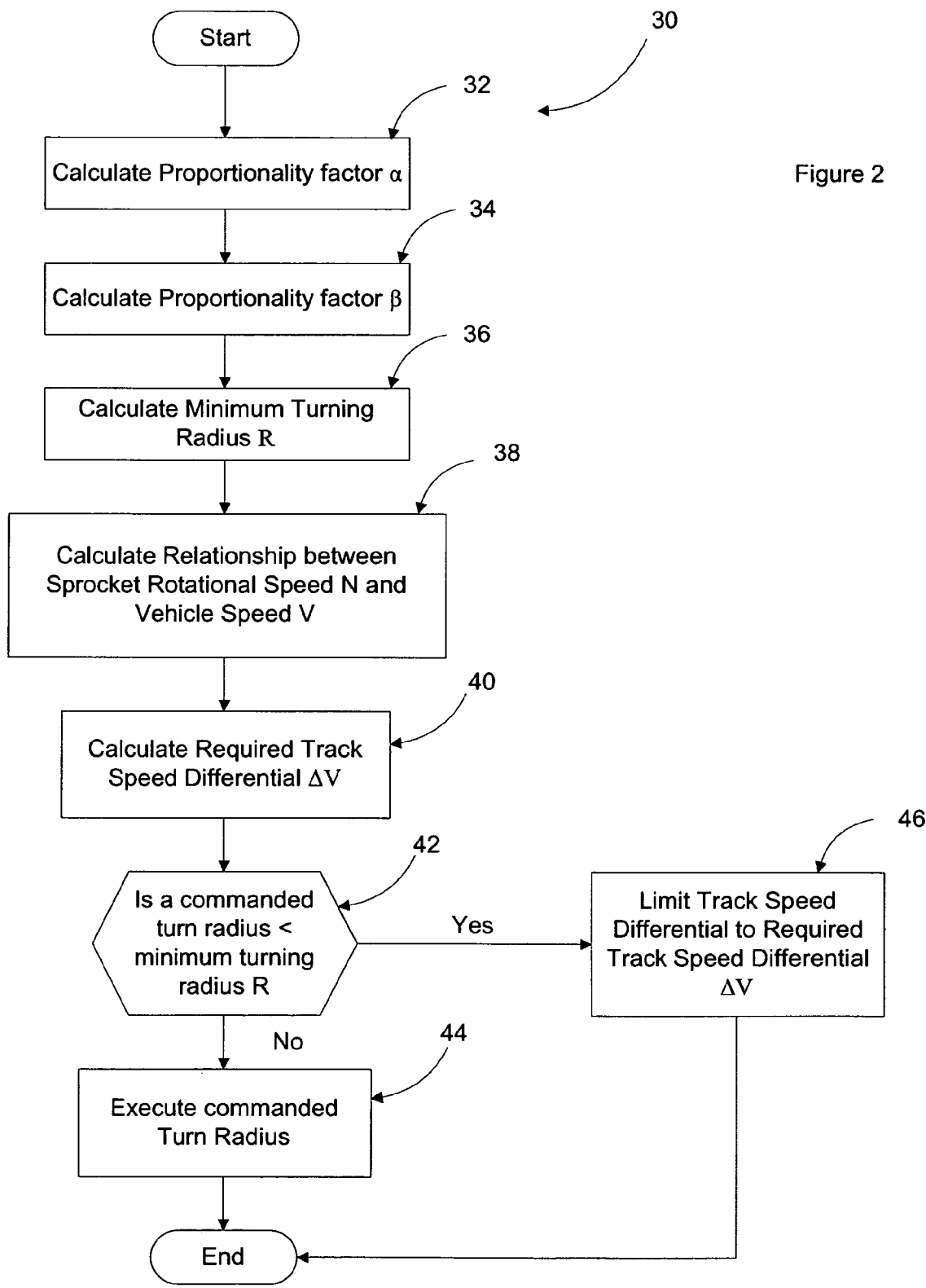
FIG. 2 is a flow chart illustrating a method of the present invention.

FIG. 2 depicts a method of the present invention. More precisely, FIG. 2 shows a series of block diagrams representing steps performed by a transmission control module or TCM 24 (shown in FIG. 1). To illustrate the method of the present invention, some attributes of the tracked vehicle 10 will be assigned exemplary values. Therefore, for illustrative purposes only, the vehicle 10 should be considered to be traveling at a vehicle speed V of 10 m/s; the vehicle track center distance T is 2.108 m; the vehicle track length L is 3.702 m; and the pitch diameter PD of the sprockets 16, 18 (shown in FIG. 1) is 0.534 m.

Referring to FIG. 2, the traction control method 30 (also referred to herein as algorithm 30) of the present invention is configured at step 32 to determine a track proportionality factor a for the vehicle 10. For purposes of the present invention, "determining a track proportionality factor a" may include calculating the track proportionality factor a, looking up the track proportionality factor a such as from a look-up table, receiving the track proportionality factor a from a remote location, etc. The track proportionality factor a may be calculated from the vehicle track center distance T and the vehicle track length L according to the following equation:

$$= \frac{T}{L} = \frac{2.108}{3.702} = 0.57$$

At step 34, the algorithm 30 is configured to determine a vehicle proportionality factor β for the vehicle 10. For purposes of the present invention, "determining a vehicle proportionality factor β" may include calculating the vehicle proportionality factor β, looking up the vehicle proportionality factor β such as from a look-up table, receiving the vehicle proportionality factor β from a remote location, etc. The vehicle proportionality factor β is a factor relating turning ability of a tracked vehicle 10 (shown in FIG. 1) to track configuration. The vehicle proportionality factor β is calculated from the proportionality factor α according to the following equation:

$$\beta = \left(\frac{0.664}{\sqrt{\alpha}} - 0.212\right)^2 = \left(\frac{0.664}{\sqrt{0.57}} - 0.212\right)^2 = 0.446$$

At step 36, the algorithm 30 is configured to calculate the minimum turning radius R of the vehicle 10 (shown in FIG. 1) based on vehicle speed V, coefficient of friction μ, and gravitational acceleration G (9.80665 m/s²). It has been observed that the maximum coefficient of friction that can be achieved between the tracks of a tracked vehicle and the ground is generally approximately 0.7. It should be appreciated that the maximum coefficient of friction can vary such as, for example, depending on ground conditions like snow or ice. According to the preferred embodiment, the more general estimate of: the maximum coefficient of friction (0.7) is implemented; however, according to alternate embodiments this estimation may be varied. By inputting this maximum value for the coefficient of friction μ, the minimum turning radius R can be calculated such that the vehicle 10, based on the estimated maximum coefficient of friction, does not slip. The minimum turning radius R is calculated according to the following equation:

$$\text{Minimum turning radius } (R) = \frac{V^2}{\mu G} = \frac{(10 \text{ m/s})^2}{(0.7) * (9.80665 \text{ m/s}^2)} = 14.57 \text{ m}$$

At step 38, the algorithm 30 is configured to determine or obtain the relationship between sprocket rotational speed N and vehicle speed V based on the sprocket pitch diameter PD. According to a preferred embodiment, this relationship is a calibration value stored in the TCM 24 (showed in FIG. 1). The relationship between sprocket rotational speed N and vehicle speed V can be calculated according to the following equation:

$$\frac{N}{V} = \frac{60 \text{ sec/min}}{\pi * (0.534 \text{ m})} = 35.765 \frac{rpm}{m/sec}$$

This calculation shows that for each meter/second of vehicle forward velocity the sprockets 16, 18 (shown in FIG. 1) will rotate 35.765 rpm. According to the present example, the vehicle 10 (shown in FIG. 1) is traveling at a vehicle speed V of 10 m/s such that the average sprocket rotational speed N is 357.65 rpm.

At step 40, the algorithm 30 is configured to calculate the required track speed differential ΔV to achieve the minimum turn radius R.

$$\Delta V = \frac{N}{R} \times (T + \alpha L) =$$

-continued $$\left(\frac{357.65 \text{ rpm}}{14.57 \text{ m}}\right) \times (2.108 \text{ m} + 0.446 \times 3.702 \text{ m}) = 92.3 \text{ rpm}$$

At step 42, the algorithm 30 is configured to determine whether a commanded turn radius is less than the calculated minimum turn radius R. If, at step 42, the commanded turn radius is greater than or equal to the minimum turn radius R, the algorithm 30 executes the turn command at step 44. If, at step 42, the commanded turn radius is less than the minimum turn radius R, the algorithm 30 proceeds to step 46. At step 46, the algorithm 30 is configured to limit the track speed differential of the vehicle 10 (shown in FIG. 1) to the required track speed differential such that the 0.7 coefficient of friction is not exceeded and traction is maintained.

Referring to the illustrative example outlined hereinabove, if the driver of the vehicle 10 (shown in FIG. 1) attempts to turn at a radius less than 14.57 meters while traveling at a speed of 10 meters/second, the TCM 24 (shown in FIG. 1) will command the transmission 14 (shown in FIG. 1) to limit the allowed track speed differential ΔV to 92.3 rpm thereby preventing the tracked vehicle 10 from exceeding the 0.7 coefficient of friction and possibly losing traction. As the tracked vehicle 10 changes speed, the TCM 24 will continually update the calculations outlined herein above to provide a corresponding track speed differential.

While the best modes for carrying out the invention have been described in detail, those familiar with the art to which this invention relates will recognize various alternative designs and embodiments for practicing the invention within the scope of the appended claims.

The invention claimed is:

1. A traction control method for a tracked vehicle comprising:
    calculating a minimum turn radius of the tracked vehicle at which the tracked vehicle does not slip using a maximum coefficient of friction between tracks of the vehicle and ground;
    calculating a required track speed differential configured to turn the tracked vehicle at the minimum turn radius;
    determining if a commanded turn radius is less than the minimum turn radius; and
    limiting the track speed differential of the tracked vehicle by selectively transferring more power to at least one of a first track and a second track to achieve the required track speed differential if the commanded turn radius is less than the minimum turn radius such that the tracked vehicle does not slip;
    wherein said calculating a required track speed differential includes determining a track proportionality factor α and a vehicle proportionality factor β, and the vehicle proportionality factor β is calculated from the track proportionality factor α according to an equation $$\beta = \left(\frac{0.664}{\sqrt{\alpha}} - 0.212\right)^2.$$

2. The traction control method of claim 1, wherein said calculating a required track speed differential includes determining a relationship between a sprocket rotational speed and a vehicle speed of the tracked vehicle.

3. The traction control method of claim 1, wherein said calculating a required track speed differential includes determining a sprocket rotational speed.

4. The traction control method of claim 1, further comprising executing the commanded turn radius if the commanded turn radius is greater than or equal to the minimum turn radius.

5. The traction control method of claim 1, further comprising measuring a track length of the tracked vehicle.

6. The traction control method of claim 1, further comprising measuring a track center distance of the tracked vehicle.

7. A traction control method for a tracked vehicle comprising:
  determining a track proportionality factor α;
  determining a vehicle proportionality factor β using said track proportionality factor according to an equation $$\beta = \left(\frac{0.664}{\sqrt{\alpha}} - 0.212\right)^2;$$

calculating a minimum turn radius of the tracked vehicle at which the tracked vehicle does not slip using a maximum coefficient of friction between tracks of the vehicle and ground;
  calculating a required track speed differential using said vehicle proportionality factor β and said minimum turn radius, said required track speed differential being configured to turn the tracked vehicle at the minimum turn radius;
  determining if a commanded turn radius is less than the minimum turn radius; and
  limiting the track speed differential of the tracked vehicle by selectively transferring more power to at least one of a first track and a second track to achieve the required track speed differential if the commanded turn radius is less than the minimum turn radius such that the tracked vehicle does not slip.

8. The fraction control method of claim 7, wherein said calculating a required track speed differential includes determining a relationship between a sprocket rotational speed and a vehicle speed of the tracked vehicle.

9. The traction control method of claim 7, wherein said calculating a required track speed differential includes determining a sprocket rotational speed.

10. The fraction control method of claim 7, further comprising executing the commanded turn radius if the commanded turn radius is greater than or equal to the minimum turn radius.

11. The traction control method of claim 7, further comprising measuring a track length of the tracked vehicle.

12. The fraction control method of claim 7, further comprising measuring a track center distance of the tracked vehicle.

13. A traction control method for a tracked vehicle comprising:
  determining a track proportionality factor α;
  determining a vehicle proportionality factor β using the track proportionality factor according to an equation $$\beta = \left(\frac{0.664}{\sqrt{\alpha}} - 0.212\right)^2;$$

calculating a minimum turn radius of the tracked vehicle at which the tracked vehicle does not slip using a maximum coefficient of friction between tracks of the vehicle and ground;
  determining a sprocket rotational speed;
  calculating a required track speed differential using the vehicle proportionality factor β, the minimum turn radius, and the sprocket rotational speed, said required track speed differential being configured to turn the tracked vehicle at the minimum turn radius;
  determining if a commanded turn radius is less than the minimum turn radius;
  executing the commanded turn radius if the commanded turn radius is greater than or equal to the minimum turn radius; and
  limiting the track speed differential of the tracked vehicle by selectively transferring more power to at least one of a first track and a second track to achieve the required track speed differential if the commanded turn radius is less than the minimum turn radius such that the tracked vehicle does not slip.

14. The traction control method of claim 13, further comprising measuring a track length of the tracked vehicle.

15. The fraction control method of claim 13, further comprising measuring a track center distance of the tracked vehicle.

* * * * *